United States Patent
Jeanne et al.

(10) Patent No.: US 10,009,842 B2
(45) Date of Patent: Jun. 26, 2018

(54) METHOD FOR EXITING A LOW-CONSUMPTION STANDBY MODE, AND ASSOCIATED DEVICE

(75) Inventors: Ludovic Jeanne, Montreuil sur Ille (FR); Jean-Yves Moraillon, Cesson Sevigne (FR); Jean-Marie Steyer, Chateaubourg (FR)

(73) Assignee: Thomson Licensing, Issy-les-Moulineaux (FR)

( * ) Notice: Subject to any disclaimer, the term of this patent is extended or adjusted under 35 U.S.C. 154(b) by 780 days.

(21) Appl. No.: 14/124,710

(22) PCT Filed: Jun. 7, 2012

(86) PCT No.: PCT/EP2012/060839
§ 371 (c)(1),
(2), (4) Date: Mar. 7, 2014

(87) PCT Pub. No.: WO2012/168391
PCT Pub. Date: Dec. 13, 2012

(65) Prior Publication Data
US 2014/0198697 A1    Jul. 17, 2014

(30) Foreign Application Priority Data
Jun. 9, 2011 (KR) ..................... 11 55061

(51) Int. Cl.
*H04W 52/02* (2009.01)
*H04N 21/443* (2011.01)

(52) U.S. Cl.
CPC .... *H04W 52/0212* (2013.01); *H04N 21/4436* (2013.01)

(58) Field of Classification Search
CPC ...................... H04W 52/0212; H04N 21/4436
(Continued)

(56) References Cited

U.S. PATENT DOCUMENTS 6,678,831 B1 * 1/2004 Mustafa ................ G06F 1/3203
                                                    713/300
7,386,738 B2    6/2008 Trappeniers et al.
(Continued)

FOREIGN PATENT DOCUMENTS

CN    101261534 A    9/2008
CN    102047677 A    5/2011
(Continued)

OTHER PUBLICATIONS

Agarwal et al. "On Demand Paging Using Bluetooth Radios on 802.11 Based Networks", Jul. 1, 2003, pp. 1-19.*
(Continued)

*Primary Examiner* — Andrew Lai
*Assistant Examiner* — Andrew C Lee
(74) *Attorney, Agent, or Firm* — Myers Wolin LLC (57) ABSTRACT

The invention relates to a method for controlling a device operating in several operating modes corresponding to different levels of power consumption and comprising a first and a second communication interface, said method being characterized in that it comprises the steps of activating said second communication interface upon receiving a first wake-up message via said first interface and receiving a second wake-up message via said second communication interface, said second wake-up message resulting in the exit from the low-power standby mode of the device.

12 Claims, 5 Drawing Sheets

(58) Field of Classification Search
USPC .......................................................... 370/311
See application file for complete search history.

(56) References Cited

U.S. PATENT DOCUMENTS

| | | | | |
|---|---|---|---|---|
| 7,406,610 | B2* | 7/2008 | Kardach | G06F 1/3203 713/300 |
| 7,428,650 | B2* | 9/2008 | Kardach | G06F 1/3203 710/15 |
| 7,571,332 | B2 | 8/2009 | Cromer et al. | |
| 7,899,923 | B2 | 3/2011 | Siegmund | |
| 8,037,218 | B2* | 10/2011 | Fujii | G06F 13/4282 370/328 |
| 8,095,667 | B1* | 1/2012 | Karl | G06F 1/32 709/227 |
| 8,199,686 | B1* | 6/2012 | Donovan | H04W 52/0212 370/311 |
| 8,447,368 | B2* | 5/2013 | Zettler | H04W 88/08 370/311 |
| 2002/0023237 | A1* | 2/2002 | Yamada | G06F 1/3209 713/323 |
| 2002/0172218 | A1* | 11/2002 | Harrison | H04L 1/0002 370/443 |
| 2004/0003307 | A1 | 1/2004 | Tsuji | |
| 2004/0128310 | A1 | 7/2004 | Zmudzinski et al. | |
| 2005/0034001 | A1* | 2/2005 | Pontarelli | H04W 52/0251 713/320 |
| 2006/0075269 | A1* | 4/2006 | Liong | G06F 1/3209 713/300 |
| 2006/0202804 | A1* | 9/2006 | Vijay-Pillai | G06K 19/0705 340/10.33 |
| 2007/0124621 | A1* | 5/2007 | Kim | G06F 1/3203 713/323 |
| 2007/0176752 | A1* | 8/2007 | Mickle | G06K 19/0723 340/10.33 |
| 2007/0232358 | A1* | 10/2007 | Sherman | H04B 1/3805 455/560 |
| 2008/0097911 | A1* | 4/2008 | Dicks | G06Q 50/24 705/50 |
| 2008/0103370 | A1* | 5/2008 | Dicks | G06F 19/3418 600/300 |
| 2009/0073481 | A1 | 3/2009 | Ferlitsch et al. | |
| 2010/0023788 | A1* | 1/2010 | Scott | G06F 1/3209 713/320 |
| 2010/0033424 | A1 | 2/2010 | Kabasawa et al. | |
| 2010/0083020 | A1* | 4/2010 | Suzuki | G06F 1/3209 713/322 |
| 2010/0120476 | A1* | 5/2010 | Zettler | H04W 88/08 455/574 |
| 2010/0125726 | A1* | 5/2010 | Chen | H04L 12/12 713/100 |
| 2010/0235667 | A1* | 9/2010 | Mucignat | G06F 1/3203 713/323 |
| 2011/0062794 | A1* | 3/2011 | Vergoossen | H04L 12/12 307/125 |
| 2011/0090830 | A1* | 4/2011 | Churei | G03G 15/5004 370/311 |
| 2011/0107116 | A1 | 5/2011 | Diab et al. | |
| 2011/0173473 | A1* | 7/2011 | Cho | G06F 1/3203 713/323 |
| 2011/0182275 | A1* | 7/2011 | Mizusawa | H04L 29/12952 370/338 |
| 2011/0249571 | A1* | 10/2011 | Das | H04W 88/182 370/252 |
| 2011/0307727 | A1 | 12/2011 | Wu | |
| 2012/0033611 | A1* | 2/2012 | Wu | H04W 24/02 370/328 |

FOREIGN PATENT DOCUMENTS

| | | |
|---|---|---|
| EP | 2252118 | 11/2010 |
| JP | 2004-38295 A | 2/2004 |
| JP | 2009-70366 A | 4/2009 |
| JP | 2009-111738 A2 | 5/2009 |
| JP | 2010-86068 A | 4/2010 |
| KR | 10-0956377 B1 | 5/2010 |
| KR | 10-2010-0068790 A | 6/2010 |
| KR | 10-1008473 B1 | 1/2011 |
| TW | 200503471 | 1/2005 |
| WO | 2009/144626 A1 | 12/2009 |
| WO | 201010941182 A1 | 8/2010 |

OTHER PUBLICATIONS

Argawal et al._"On demanding Paging Usibg Bluetooth Radios on 802.11 based networks"_Internet Citation_Jul. 1, 2003 (Jul. 1, 2003), pp. 1-19.
Lieberman Software Corporation:"White Paper: Xake on LAN Technology", Jun. 1, 2006( Jun. 1, 2006), pp. 1-9.
Popa et al:"Embedded server xith Wake on LAN function", EUROCON 2009, May 18, 2009 (May 18, 2009), pp. 365-370.
Search Report dated Aug. 8, 2012.
European Office Action for EP application No. 12 829 081.5 dated Aug. 18, 2017.
Shih et al., "Wake on Wireless: An Event Driven Energy Saving Strategy for Battery Operated Devices," Proceedings of the 8th Annual International Conference on Mobile Computing and Networking, MOBICOM 2002, Atlanta, Georgia, Sep. 23-28, 2002, pp. 1-12.

* cited by examiner

METHOD FOR EXITING A LOW-CONSUMPTION STANDBY MODE, AND ASSOCIATED DEVICE

This application claims the benefit, under 35 U.S.C. § 365 of International Application PCT/EP2012/060839, filed Jun. 7, 2012, which was published in accordance with PCT Article 21(2) on Dec. 13, 2012 and which claims the benefit of French patent application No. 1155061 filed Jun. 09, 2011

1. FIELD OF THE INVENTION

The invention relates to the field of audiovisual programme receiver decoders and more specifically to the power consumption in standby mode and on exiting standby mode.

2. PRIOR ART

Audiovisual programme receivers/decoders offer the user an increasing number of functions. There are different types of decoder, differentiable by the input interface. Some connect to an antenna socket enabling reception of a DTT (Digital Terrestrial Television) signal, others are connected to a cable network installed by an operator and still others have a network input interface for connection to a home local network or to a modem router itself connected to the Internet. In this latter case, the decoder is intended for IPTV (Internet Protocol Television) reception. The are also hybrid decoders, which have several input interfaces such as, for example, a DTT tuner and an Ethernet network interface (IEEE802.3). In this case the decoder can receive and reproduce a programme received by one or other of the interfaces.

The increasing development of digital products for home use, such as, for example, television, computers, organisers, mobile telephones, data storage devices and printers, is such that it is advantageous to interconnect them via the intermediary of a home network. This type of local network, commonly called LAN (Local Area Network), can be wired (for example with a connection of Ethernet type) or wireless (with for example a WiFi connection) or can combine the two types of interconnection between the devices which are connected thereto.

There currently exist configurations linking several audiovisual programme decoders in a same household. Functions are thus available to the user, such as the sharing of audiovisual programmes or the option of watching several different programmes on several television sets connected respectively to several decoders, for example in different rooms of the house.

There thus exist configurations where a decoder connected to the source of the signal is of "master" type and the data corresponding to an audiovisual programme can be transmitted from the "master" decoder to other decoders called "slave" decoders, connected to the "master" decoder via the intermediary of a local network, with a view to the reproduction of the programme.

Although configurations including a large number of interconnected devices enable the user to benefit from convenient functions, they nevertheless give rise to high power consumption due to the proliferation of devices. Also, it is becoming increasingly important to control power consumption of home-use devices and power consumption of the whole of an installation and more generally of the whole of a household.

There currently exist power consumption directives. These directives must be considered carefully during the design stages for consumer devices.

In the case of an installation where decoders are interconnected and where a "master" decoder is used as an audiovisual programme server for a "slave" decoder, it is not conceivable to have to keep the "master" decoder in a high consumption state when it is not in use. A "slave" decoder wanting to receive an audiovisual programme from a "master" decoder must be able to wake it up if this latter is in standby mode, thus enabling it to be in standby mode as often as possible. This operation for waking up the "master" decoder can be carried out via the intermediary of the local network. A slave decoder sends for example a message to the "master" decoder in order to ask it to exit standby mode and to provide the requested service or services.

The constraint of significant reduction in power consumption, coupled with the necessity to be able to wake up the devices creates a problem. It is necessary to have standby modes corresponding to the lowest possible power consumptions and necessary to be able to wake up a device considering that the interfaces or modules used for the wake-up operation consume power.

When an exit from standby mode of a device is controlled via the intermediary of its network interface (for example Ethernet or WiFi), the network interface consumes several watts. This consumption has a negative impact on power saving in standby mode.

3. SUMMARY OF THE INVENTION

The invention enables at least one of the disadvantages of the prior art to be resolved by optimising the consumption in standby mode of a device while making it possible to control the exit from the standby mode via the intermediary of an interface.

More specifically the invention relates to a method for controlling a device, the device operating in several operating modes corresponding to different levels of power consumption and comprising a first and a second communication interface, the method being characterised in that it comprises, in the device the steps of activating the second communication interface upon receiving a first wake-up message via the first interface when the device is in a first operating mode corresponding to a first level of power consumption, the activation resulting in a second level of power consumption higher than the first level of power consumption, and of receiving a second wake-up message via the second communication interface, the second wake-up message resulting in the transition of the device to an operating mode corresponding to a third level of power consumption, the third level of power consumption being higher than the second level of power consumption.

According to an embodiment of the invention, the operating modes of the device correspond to the activation of subsets of functional modules comprised in the device, each of the subsets of functional modules corresponding to a level of power consumption of the device.

According to an embodiment of the invention, the first operating mode corresponds to a configuration of the device wherein only the first interface is activated.

According to an embodiment of the invention, the second operating mode corresponds to a configuration of the device wherein only the first and second interfaces are activated.

According to an embodiment of the invention, the first interface is a wireless communication interface.

According to an embodiment of the invention, the second interface is a network interface of Ethernet type.

According to an embodiment of the invention, the second interface is a wireless network interface, compatible with transmission standards 802.11.

The invention also relates to a device operating in several operating modes corresponding to different levels of power consumption and comprising a first and a second communication interface, the device being characterised in that it further comprises means for activating the second interface upon receiving via the first interface a first wake-up message when the device is in a first operating mode corresponding to a first level of power consumption, the activation resulting in a second level of power consumption higher than the first level of power consumption and means for controlling the device upon receiving via the second interface a second wake-up message, the second wake-up message resulting in the transition of the device to an operating mode corresponding to a third level of power consumption, the third level of power consumption being higher than the second level of power consumption.

According to an embodiment of the invention, the operating modes of the device correspond to the activation of subsets of functional modules comprised in the device, each of the subsets of functional modules corresponding to a level of power consumption of the device.

Advantageously, the first wake-up message sent to the first interface and the second wake-up message sent to the second interface can be transmitted by different devices, which offers great flexibility in the implementation of functions requiring interactions between several devices.

One of the advantages of the invention is the ease of implementation of the invention in the design of a product having two communication interfaces, considering the standard architecture of an audiovisual programme receiver. The standard architecture of a consumer product of this type, and the implementation of different operating modes (for example deep standby mode, standby mode with network, decoder mode, all-functions mode), is such that it is very simple, during a new design phase, to adapt an existing architecture in order to incorporate the invention and then enable, during use of the product, the wake-up of an item of equipment from another item of equipment without having to supply power to the network interface in standby mode.

4. LIST OF FIGURES

The invention will be better understood, and other specific features and advantages will emerge upon reading the following description, the description making reference to the annexed drawings wherein.

Figure 3:
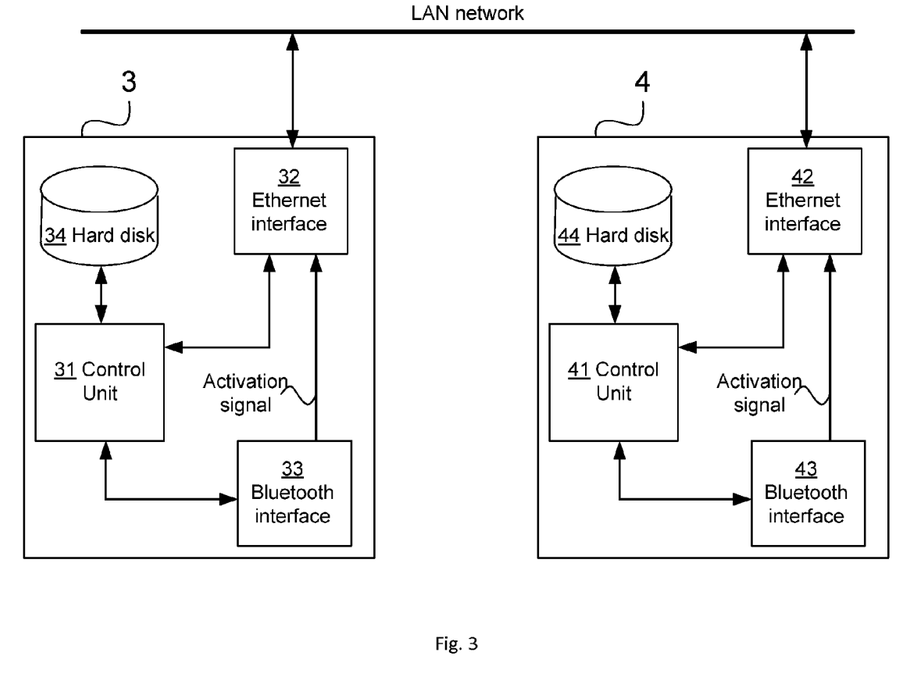
FIG. 3 diagrammatically shows the decoders of FIG. 2 and details their architecture.
Figure 5:
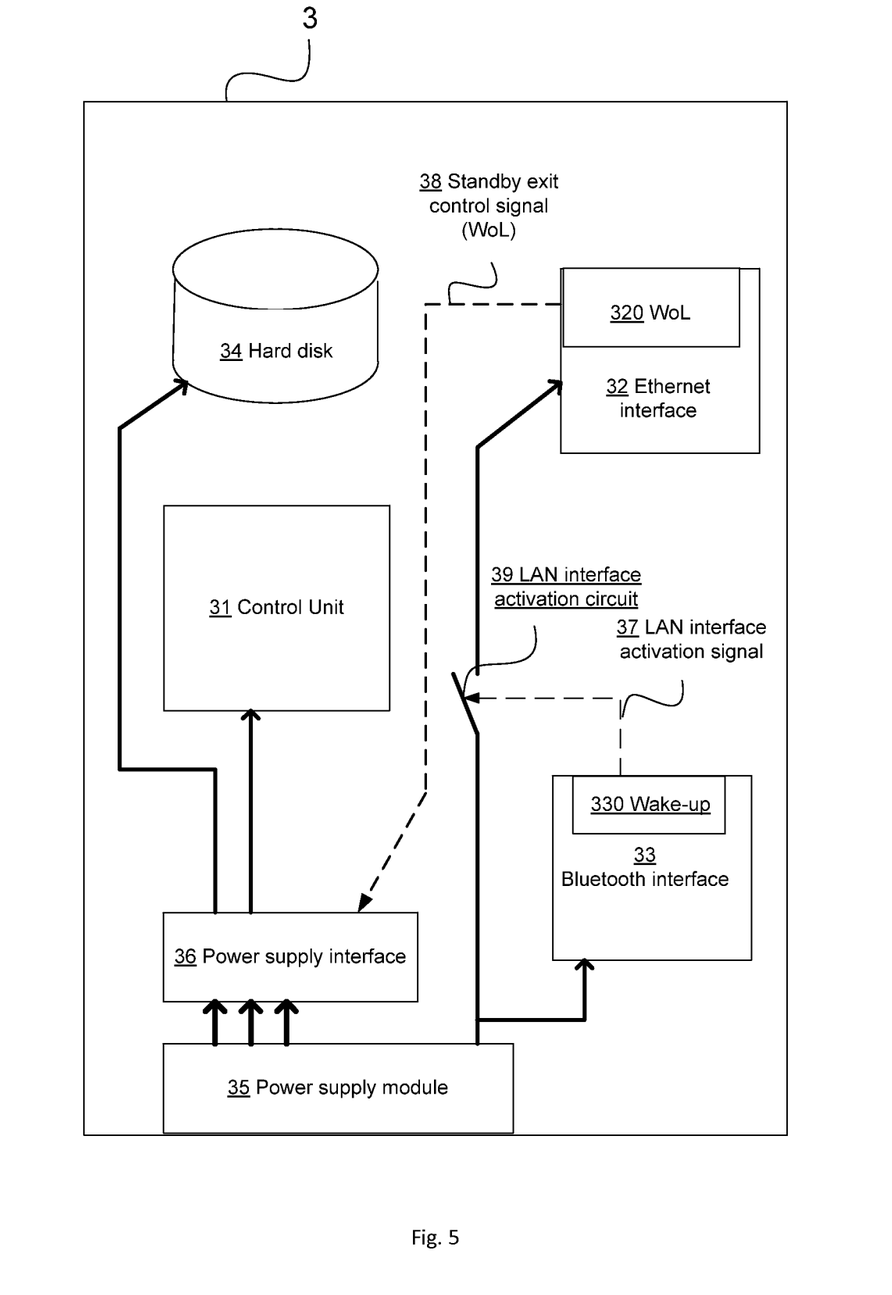
FIG. 5 shows the control signals used for the exit from the standby mode in a decoder such as shown in FIG. 3 and in an embodiment of the invention.

In FIGS. 3 and 5, the modules shown are functional units that may or may not correspond to physically distinguishable units. For example, these modules or some of them can be grouped together in a single component, or constitute functions of the same software. On the contrary, some modules may be composed of separate physical entities.

5. DETAILED DESCRIPTION OF THE INVENTION

In a general but non-restrictive way, the invention relates to a method for controlling operating modes of an audiovisual programme decoder and notably the transition of the decoder from a low-consumption standby mode to a functional mode wherein a connection to a local network is active.

Figure 1:
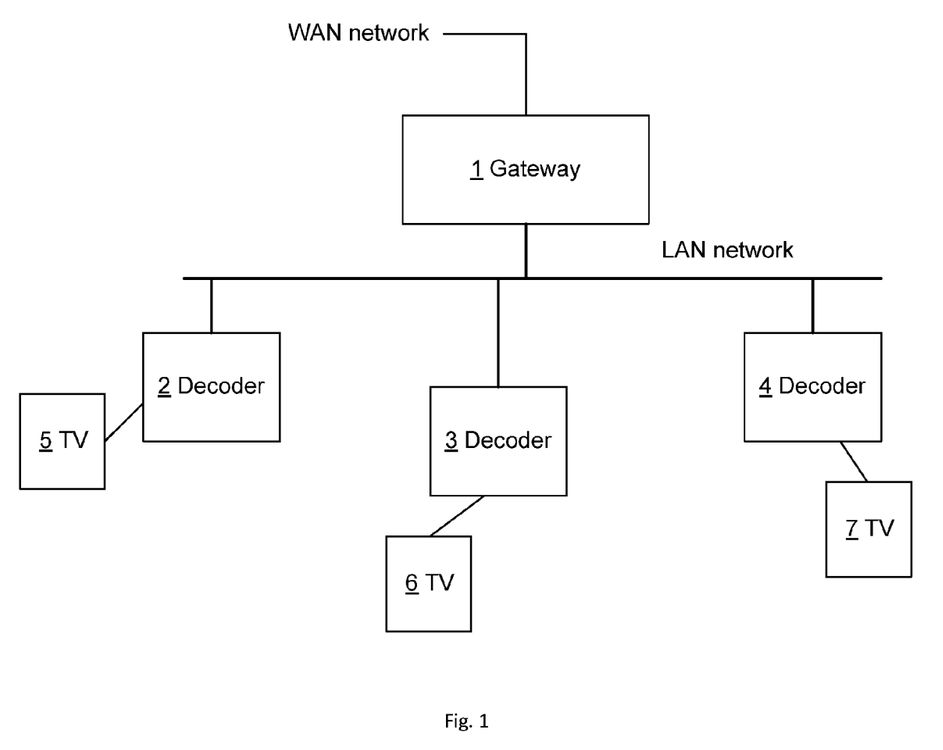
FIG. 1 shows a home network, according to a particular embodiment of the invention.

FIG. 1 shows a home local network of LAN type grouping together three television decoders 2, 3 and 4, themselves connected respectively to television sets 5, 6, 7. The decoders are devices enabling the reception of audiovisual programmes, their recording and their reproduction on display devices such as television sets 5, 6 and 7. The decoders are connected to the LAN network either by wired (for example Ethernet) or wireless (for example WiFi of type 802.11) communication interfaces. The LAN home network is connected to an external broadband network of WAN (Wide Area Network) type via the intermediary of the gateway equipment 1. The gateway is for example an ADSL (Asymmetric Digital Subscriber Line) modem-router which enables connection of a household to the Internet network and, via service providers (operators), the reception of video-on-demand and television programmes. Decoders 2, 3 and 4 comprise devices for recording received data, such as non-volatile memory or a hard disc. A decoder having recorded an audiovisual programme can, amongst other functions, serve as a local programme server for another decoder via the LAN home local network. The decoder which operates, for example, as a programme server for another decoder is called the "master" decoder. The other decoder, which receives the programme transmitted by the "master" decoder over the LAN network, is called the "slave" decoder. The power consumption of the set of equipment thus interconnected can be significant given their number. It is therefore advisable to keep each item of equipment in a standby mode each time this is possible. For example, when a decoder is not in the process of recording or reproducing a programme, it can be put into standby mode by user action or after it has detected an absence of use over a predefined time interval.

In the case where a user uses a "slave" decoder to view an audiovisual programme stored by a "master" decoder and where the "master" decoder is placed in a standby mode, it is necessary to wake up the "master" decoder. In this type of configuration where several items of equipment are interconnected via a LAN network, it is common for an item of equipment to use the network to send a command to exit standby mode (or "wake-up" command) to another item of equipment. The sending of a "magic packet" is a method designed for this type of remote activation dubbed "Wake-on LAN" or "WoL" and described in the White Paper "Wake on LAN Technology" by Lieberman Software, revision 2 dated 1 Jun. 2006). By this method, the wake-up of an item of equipment is activated when the network interface receives a data frame containing a predefined sequence. However, this type of remote wake-up requires the network interface to be active, which requires it to be supplied with power. The consumption of a network interface can be several watts, which is not ideal with regards to the recommendations and directives aiming to reduce overall power consumption and more specifically power consumption of home equipment.

Figure 2:
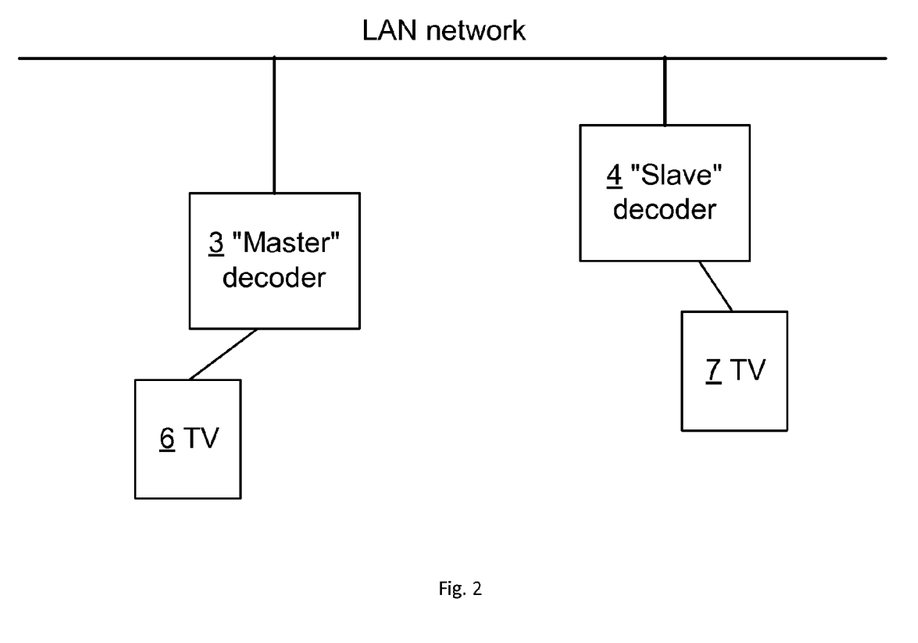
FIG. 2 shows a "master" decoder and a "slave" decoder coupled by a home local network such as that of FIG. 1, according to an embodiment of the invention.

FIG. 2 shows two decoders interconnected by a home local network. Decoder 3 is a "master" decoder capable of operating, for example, as a local programme server for "slave" decoder 4. The transmission of a programme from a "master" decoder to a "slave" decoder is an example, amongst others, of functions whose realisation requires the wake-up of a decoder by another on the local network or in a nearby environment. Decoder 4 must be able to wake up decoder 3 if this latter is in a standby mode prior to the request, for example, for transmission of an audiovisual programme stored in decoder 3. Similarly, we can imagine that a decoder might have to wake up another decoder in order to obtain a service which it does not have itself. This may be, for example, the descrambling of data, a remote payment, an authentication, or the control of third-party equipment connected to the "master" decoder by other interfaces.

According to an embodiment of the invention and in order to avoid consumption caused by the LAN network interfaces such as a WiFi module or an Ethernet interface, decoder 4 uses a communication interface with a very low level of electrical consumption to send a message to decoder 3. This interface can be wired or wireless, such as for example a Bluetooth wireless interface (such as described in the IEEE802.15.1 standard) or a Zigbee wireless interface (based on the WPAN 802.15.4 standard; Wireless Personal Area Networks). The level of electrical consumption of the low-consumption interface is sufficiently low compared to the level of consumption of an Ethernet interface or an 802.11 interface that it is possible to keep it constantly supplied with power, including when the decoder is operating in standby mode.

According to an embodiment of the invention, the message transmitted by decoder 4 and received via the low-consumption interface of decoder 3 results in the activation of the LAN network interface of decoder 3. The message is for example a message of proprietary type, carried by one or more data frames defined according to the Bluetooth standard. The message can also be a proprietary message carried by one or more data frames defined according to the Zigbee standard, or any other transmission standard defining the exchange of data corresponding to a type of communication interface. The message comprises an identifier which, interpreted by a wake-up module comprised in the Bluetooth interface of decoder 3, results in the activation of a control signal (such as described later; see notably FIG. 5), which signal enables the activation of the local network interface. Decoder 3 can then be woken up remotely by the sending of a magic packet (Wake-on LAN). This two-step method for exiting a standby mode makes it possible both to wake up a decoder in "deep standby" mode, remaining receptive and responsive to the receipt of a message, and to reduce, consequently, its electrical consumption by deactivating the interface(s) for connecting to the LAN local home network, during the transition to standby mode.

According to another embodiment of the invention, the message transmitted by decoder 4 can be a standardised message, defined in a standard corresponding to a type of communication interface, which is intended to control the exit from a standby mode of the device comprising this type of interface.

FIG. 3 shows the coupling of two audiovisual programme decoders 3 and 4 via a LAN home local network. Decoder 3 comprises a control unit 31 which is its digital core. The control unit comprises a microprocessor and memories. The memories are constituted in the standard way of a non-volatile storage memory in which is located the executable code which corresponds to all applications, routines and drivers supported by the decoder and the working memory for storing data specific to the execution of applications. The control unit further comprises the standard functional elements of an audiovisual programme decoder, such as transport interface, demultiplexer, content access control, buffer memories and audio and video decoding modules enabling a digital data stream to be decoded and the output signals to be generated from a decoded signal with a view to the reproduction of a programme on a display device. The detail of the control unit is not shown, being well known to those skilled in the art and not contributing directly to the understanding of the invention. Decoder 3 also comprises a data storage device of hard disc type for recording programmes with a view to their playback or their transmission via the LAN home network. According to an embodiment of the invention, the decoder is interfaced to the network using Ethernet interface 32. This interface can be wired or wireless and can receive a magic packet such as defined in the Wake-on Lan method in order to activate an item of equipment remotely when said item of equipment is placed in standby mode. The possible operating modes of decoder 3 include a mode where all elements are activated, making all services available and all functions implemented. Another operating mode of decoder 3 is such that all functional elements of the decoder are in standby except Bluetooth communication interface 33 whose consumption is very low. This mode, where only Bluetooth communication interface 33 is active, results in a very low residual overall consumption of the decoder in standby mode. According to the invention, there is at least one other intermediary mode wherein, in addition to Bluetooth communication interface 33, the interface for connecting to the LAN network is supplied with power. In this latter mode the consumption is increased, but nevertheless remains lower than that of the decoder when multiple functional elements (or modules) are active and numerous functions are available.

Decoder 4 is structurally identical to decoder 3. It comprises a control unit 41, a LAN network interface 42, a low-consumption interface 43 and a hard disc 44. Also, it can be used as a "slave" decoder in combination with decoder 3 then used as a "master" decoder or conversely as a "master" decoder delivering an audiovisual programme to decoder 3 in "slave" mode.

When decoder 4 in "slave" mode is preparing to receive an audiovisual programme from decoder 3 operating in standby mode, it remotely controls the exit from standby mode of decoder 3 according to the method and in the following way: control unit 41 of decoder 4 controls the sending of a wake-up message intended for decoder 3 via the intermediary of Bluetooth wireless communication interface 43. The message is transmitted by radio according to the bluetooth (short-distance) transmission protocol in the nearby environment of decoder 4. Decoder 3, in the range of the transmission field of interface 43, receives the wake-up message via Bluetooth communication interface 33. Bluetooth interface 33 of decoder 3 is still active; the other functional elements of decoder 3 are inactive. The receipt and recognition of the wake-up message via Bluetooth interface 33 of decoder 3 results in the change of state of an activate signal of LAN network interface 32 of decoder 3. According to an embodiment of the invention, the activation signal results in the switching of a circuit for supplying power to LAN interface 32. According to another embodiment, interface 32 comprises one or more integrated circuits having an activation and deactivation control input making it respectively operative or inoperative and corresponding to a standby and wake-up command for interface 32. The assertion of the activation signal between low-consumption interface 33 and LAN local network interface 32 makes network interface 32 receptive and responsive to the detection of wake-up message of Wake-on LAN type which would be sent thereto via the LAN network. After a period greater than the activation time for LAN interface 32, decoder 4 sends, under control of control unit 41 and via the intermediary of its local network interface 42, a wake-up message of "magic packet" type, via the intermediary of the LAN local network. The receipt of this "magic packet", specifying decoder 3 as recipient of the packet, results in the exit from standby mode of decoder 3 and activation of the functions necessary for the service requested, such as the transmission of a programme stored on hard disc 34 to decoder 4, via its network interface 42, with a view to its decoding and its reproduction.

Advantageously, the activation of the functions following receipt of a "magic packet" is limited to a predetermined number of functional modules of the device exiting standby. The activation can, for example, only relate to the LAN local network and the associated control logic enabling external devices to communicate via the LAN local network interface. The activation can also, according to another example, relate to a module for displaying and managing the keypad, a reception module for the remote control, one or more USB interfaces, a hard disc, a memory module, or any other module or set of modules incorporated in the device. The activation of a subset only of functional modules of a device and the availability which ensues for a subset of functions and services available to the user, in fact creates a plurality of different functional modes, which are characterised, amongst other things, by the options offered to the user and by the power consumption specific to each of these modes.

Figure 4:
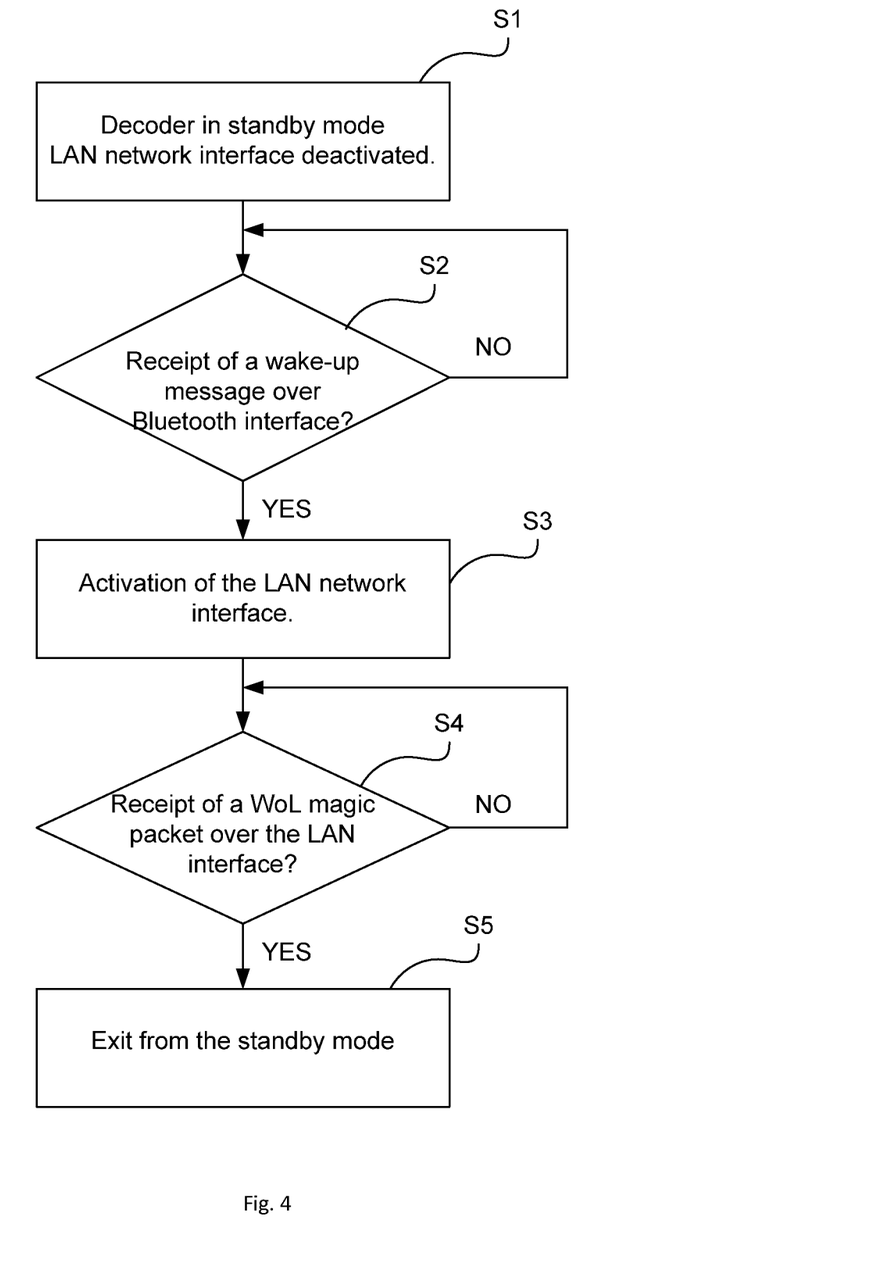
FIG. 4 is a functional diagram showing the successive steps which constitute the standby exit of the programme decoder.

FIG. 4 is a functional diagram which shows the transition from a low-consumption standby mode to an operational mode of the decoder according to an embodiment of the invention. In step S1, the decoder is in a standby mode where only the very low power consumption Bluetooth communication interface is activated. In step S2, the decoder is awaiting a wake-up message via the intermediary of the Bluetooth communication interface. In step S3, the decoder has received a wake-up message and the Bluetooth communication interface controls an activation signal for the LAN local network interface. The interface is then active and the decoder can be woken up by receipt of a magic packet over the LAN network interface. Advantageously the control signal can act on clock or power supply switching circuitry, or can be applied to one or more validation inputs of one or more integrated circuits which constitute all or part of the LAN network interface. In step S4, the decoder is awaiting a magic packet. In step S5, the receipt of a magic packet results in the wake-up of the decoder and the activation of the required functions.

FIG. 5 details the means and notably the control signals used for the exit from standby mode of the programme decoder 3. According to an embodiment of the invention, a power supply module 35 delivers power supply lines. The power supply lines deliver the power supply to the different functional blocks which constitute the decoder. A power supply line directly supplies Bluetooth interface 33 which is continually powered. Another power supply line supplies LAN local network interface 32 via an activation circuit 39. Activation circuit 39 is controlled by an activation signal 37 of the LAN interface, generated by wake-up module 330 of Bluetooth interface 33. The other power supply lines transit via power supply interface 36 which enables the opening or closing of the lines and therefore the application or not of the power supply voltages corresponding to the other functional blocks (31, 34). The power supply interface is controlled by the standby exit control signal 38, itself generated by WoL (Wake-on LAN) module 320 of LAN local network interface 32.

According to an embodiment of the invention, Bluetooth communication interface 33 of decoder 3 placed in standby mode can receive a wake-up message. The incoming messages are interpreted by wake-up module 330 of Bluetooth interface 33. In the case where a message received is interpreted as a wake-up message intended for decoder 3, for example by the recognition of a specific identifier in a data frame, wake-up module 330 sets activation signal 37 of the LAN local network interface to control activation circuit 39 in order to supply power to LAN local network interface 32. Then, and upon receiving a "magic packet" intended for decoder 3, the WoL module of the LAN local network interface sets standby exit control signal 38 to control power supply interface 36 and to close the power supply lines with a view to supplying the control unit 31 and hard disc 34 functional blocks and to exiting standby mode. Decoder 3 then exits standby mode and the functions which require the operation of control unit 31 and hard disc 34 are then available. This is the case, for example, for the transmission of an audiovisual programme to another decoder, via the intermediary of LAN local network interface 32, with a view to its decoding and its reproduction.

This wake-up method in two successive steps enables a decoder to be activated by exiting standby mode while avoiding the power consumption inherent in keeping the LAN network interface active.

The power consumption of the decoder is thereby significantly reduced, which makes it possible to better meet the requirements of the directives aiming to reduce overall consumption of home equipment.

The invention, described in the context of a transmission of a programme from a decoder to another decoder via a home network, nevertheless relates to any other device having at least two communication interfaces and several operating modes corresponding to several levels of power consumption.

The invention can be applied for example to a computer comprising two communication interfaces such as a WiFi interface and a Bluetooth interface. Another application example is an item of storage server equipment intended to be used on a local network, typically called NAS (Network Attached Storage), which equipment can be woken up by a computer placed in a nearby environment and using for example a Bluetooth interface to send a first wake-up message and a WiFi or wired Ethernet interface to send a "magic packet".

The invention claimed is:

1. A method for controlling a device, said device operating in several operating modes corresponding to different levels of power consumption and comprising a first and a second communication interface for communicating with other devices belonging respectively to a first and a second network, wherein said method comprises:

activating said second communication interface upon receiving a first wake-up message via said first communication interface when said device is in a first operating mode corresponding to a first level of power consumption, said activation resulting in a second level of power consumption higher than said first level of power consumption;

receiving a second wake-up message via said second communication interface, said second wake-up message resulting in the closure of power supply lines with a view to supplying power to a control unit, an exit from a standby mode, and consequently a transition of said device to an operating mode corresponding to a third level of power consumption, said third level of power consumption being higher than said second level of power consumption.

2. The method according to claim 1, wherein said first operating mode corresponds to a configuration of said device wherein only said first communication interface is activated.

3. The method according to claim 1, wherein said second operating mode corresponds to a configuration of said device wherein only said first and second communication interface are activated.

4. The method according to claim 1, wherein said first communication interface is a wireless communication interface.

5. The method according to claim 1, wherein said second communication interface is a network interface of Ethernet type.

6. The method according to claim 1, wherein said second communication interface is a wireless network interface, compatible with the 802.11 transmission standards.

7. A device operating in several operating modes corresponding to different levels of power consumption and comprising a first and a second communication interface for communicating with other devices belonging respectively to a first and a second network, said device further comprising a memory and at least one processor coupled to the memory, the at least one processor being configured to:

activate said second communication interface upon receiving, via said first communication interface a first wake-up message when said device is in a first operating mode corresponding to a first level of power consumption, said activation resulting in a second level of power consumption higher than said first level of power consumption; and control said device upon receiving via said second communication interface a second wake-up message, said second wake-up message resulting in the closure of power supply lines with a view to supplying power to a control unit, an exit from a standby mode, and consequently a transition of said device to an operating mode corresponding to a third level of power consumption, said third level of power consumption being higher than said second level of power consumption.

8. The device according to claim 7, wherein said first operating mode corresponds to a configuration of said device wherein only said first communication interface is activated.

9. The device according to claim 7, wherein said second operating mode corresponds to a configuration of said device wherein only said first and second communication interface are activated.

10. The device according to claim 7, wherein said first communication interface is a wireless communication interface.

11. The device according to claim 7, wherein said second communication interface is a network interface of Ethernet type.

12. The device according to claim 7, wherein said second communication interface is a wireless network interface, compatible with the 802.11 transmission standards.

* * * * *